(12) United States Patent
Butterbach et al.

(10) Patent No.: US 6,767,424 B1
(45) Date of Patent: Jul. 27, 2004

(54) HOT-MELT ADHESIVE FOR GLUEING DVDS

(75) Inventors: Ruediger Butterbach, Essen (DE); Ulrike Maassen, Neuss (DE); Dirk Bonke, Duesseldorf (DE); Siegfried Kopannia, Krefeld (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/807,837

(22) PCT Filed: Oct. 9, 1999

(86) PCT No.: PCT/EP99/07579

§ 371 (c)(1),
(2), (4) Date: Aug. 3, 2001

(87) PCT Pub. No.: WO00/23537

PCT Pub. Date: Apr. 27, 2000

(30) Foreign Application Priority Data

Oct. 20, 1998 (DE) .......................................... 198 48 146

(51) Int. Cl.[7] .............................................. B29C 47/00
(52) U.S. Cl. ...................... 156/245; 156/327; 369/286; 428/65.2
(58) Field of Search ................................ 156/327, 314, 156/245; 428/64.1, 64.4, 65.2; 524/487; 369/283, 286

(56) References Cited

U.S. PATENT DOCUMENTS

| | | | |
|---|---|---|---|
| 4,503,531 A | 3/1985 | Kato | |
| 5,001,179 A | * 3/1991 | Kauffman et al. | 524/487 |
| 5,037,874 A | * 8/1991 | Nuttens et al. | 524/487 |
| 5,077,120 A | 12/1991 | Kato et al. | |
| 5,128,388 A | 7/1992 | Komori et al. | |
| 5,227,213 A | 7/1993 | Komori et al. | |
| 5,703,868 A | * 12/1997 | Kobayashi et al. | 369/286 |
| 5,936,934 A | 8/1999 | Kuribayashi et al. | |
| 6,125,299 A | * 9/2000 | Groenke et al. | 156/314 |

FOREIGN PATENT DOCUMENTS

| | | |
|---|---|---|
| DE | 32 24 647 | 2/1983 |
| DE | 32 46 857 | 7/1983 |
| DE | 38 40 391 | 6/1989 |
| EP | 0 243 976 | 11/1987 |
| EP | 0 735 530 | 10/1996 |
| EP | 0 844 608 | 5/1998 |
| JP | 09208919 | 12/1997 |
| WO | WO98/40883 | 9/1998 |

* cited by examiner

Primary Examiner—Jeff H. Aftergut
Assistant Examiner—John L. Goff
(74) Attorney, Agent, or Firm—Stephen D. Harper; Gregory M. Hill

(57) ABSTRACT

The present invention relates to a process for preparing a digital versatile disc. The process of the present invention includes providing a hot melt adhesive containing at least one thermoplastic elastomer, at least one hydrocarbon resin, at least one poly-α-olefin, and at least one polar wax, and providing at least two disc blanks. The hot melt adhesive is applied directly or indirectly to at least one of the blanks and the blanks are bonded together using the hot melt adhesive. The present invention also provides a digital versatile disc containing the hot melt adhesive.

19 Claims, 1 Drawing Sheet

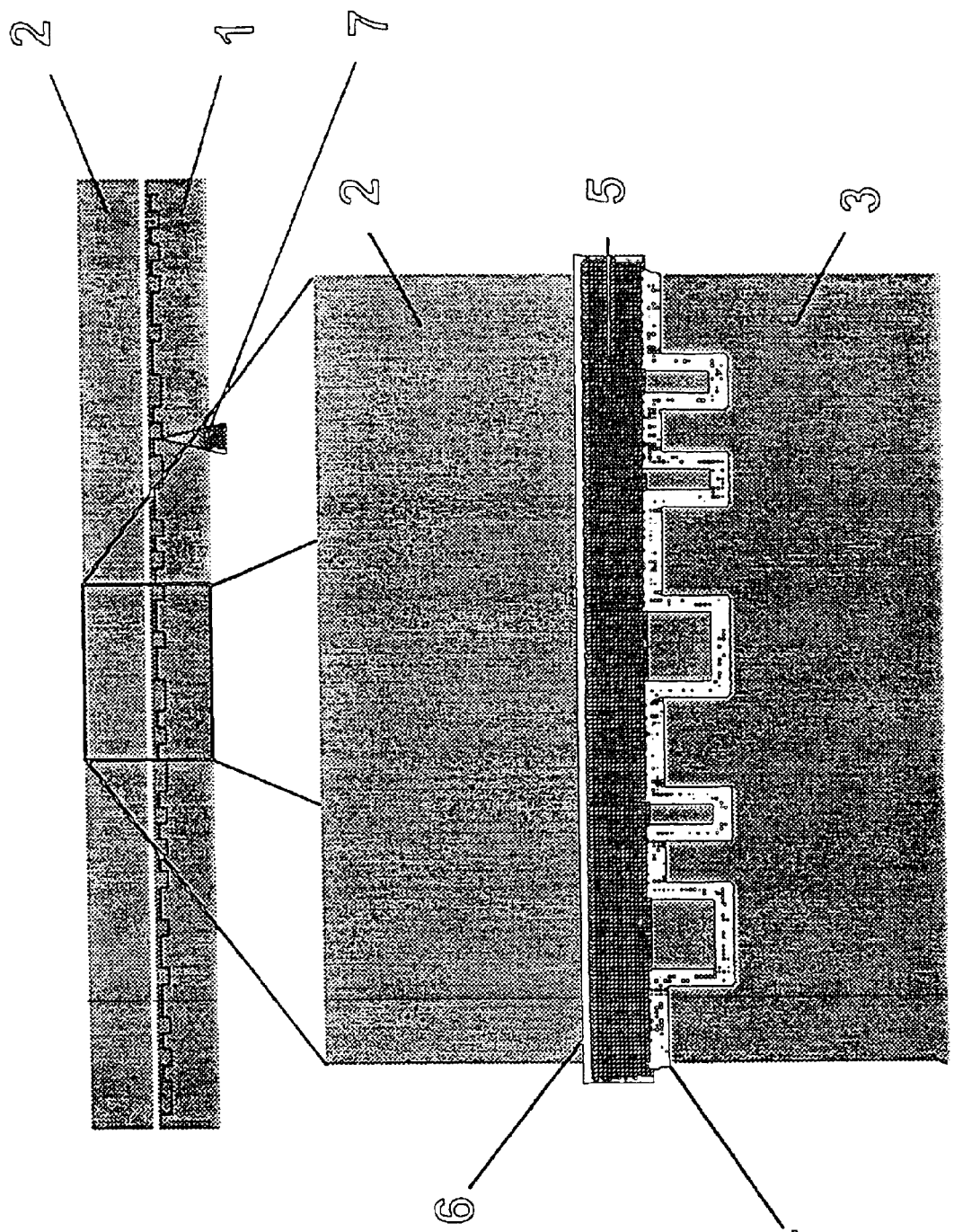

HOT-MELT ADHESIVE FOR GLUEING DVDS

CROSS REFERENCE TO RELATED APPLICATIONS

This application is a national stage application under 35 U.S.C. §371 of international application PCT/EP99/007579 filed on Oct. 9, 1999, the international application not being published in English. This application also claims priority under 35 U.S.C. §119 to DE 198 48 146.2 filed on Oct. 20, 1998.

FIELD OF THE INVENTION

This invention relates to hotmelt adhesives for bonding DVDs of sandwich construction and to a process for the production of !DVDs of sandwich constuction

BACKGROUND OF THE INVENTION

"DVD" is the abbreviation for digital versatile disc or digital video disc. These are optical storage media similar to the known CDs (compact discs). The principal difference between DVDs and CDs and other known storage media is the far higher density of the musical, graphic or data information stored in DVDs. This higher data or information density of the storage medium imposes stringent demands on the manufacturing process and the materials used therein.

One possible structure for a DVD is schematized in FIG. 1. The DVD in question is a so-called (DVD 5 which consists essentially of two halves,) is one-sided and carries a layer of information; it has a storage capacity of 4.7 gigabytes. In FIG. 1, the layer which carries the information is denoted by the reference numeral "1" while the outer layer which does not carry any information is denoted by the reference numeral "2". The laser beam required to scan the information is denoted by the reference numeral "7".

Accordingly, the construction of DVDs differs from that of the generally known CDs (compact discs) in the fact that (DVDs have a sandwich construction) Whereas CDs essentially consist of a 1.2 mm thick disc of polycarbonate or poly(meth)acrylate resin, (DVDs are made of two 0.6 mm thick discs for which polycarbonate is almost exclusively used today.) Through a refined data structure and lasers of minimal wavelength, the information layer of a DVD can contain ca. 4.7 gigabytes of information whereas conventional CDs can only store around 640 megabytes of information.

The sandwich construction of DVDs means that the two layers 1 and 2 have to be joined together. Originally, solvent-based adhesives were used to join the two layers together. More recently, hotmelt adhesives, UV-curable solvent-free liquid adhesives and UV-crosslinkable hotmelt adhesives have been proposed.

The following steps are absolutely essential in the production of a DVD:
The polycarbonate or poly(meth)acrylate blanks have to be made by injection molding.
The blank 1 carrying the layer of information is coated with a reflective layer. This is generally a reflection layer, for example of aluminium, applied by vapor deposition in vacuo.
The reflective layer has to be protected against corrosion immediately after production. In one known embodiment, therefore, a lacquer film cured by UV radiation is applied to the reflective layer. An alternative method comprises applying a protective film of a thermoplastic material.
The blank 2 without a layer of information can be printed with graphics and text by various methods.
The blanks 1 and 2 are bonded together with an adhesive.

DE-A-3224647 describes a process for the production of optical video discs or digital audio discs. According to this document, the layer carrying the information, after coating with a reflective film of aluminium, is provided with a protective film of a thermoplastic film-forming material which melts at a predetermined temperature and hardens at room temperature. In one embodiment, this thermoplastic film-forming material is also the adhesive for bonding the two disc substrate halves together. In another embodiment, this film-forming material is coated with another adhesive which is tacky at room temperature. The two disc substrates are bonded together with this adhesive. DE-A-3224647 does not provide any details of the composition of the thermoplastic film-forming material or of the adhesive tacky at room temperature. In addition, there is nothing in the teaching of DE-A-3224647 to indicate whether these adhesive materials would also be suitable for the production of DVDs.

DE-A-3246857 describes an optical disc comprising a pair of substrates of which at least one has information pits formed on one surface. A metallic layer of a reflective film is applied to this layer of information pits and a protective resin layer is in turn applied to the metallic reflective film. Applied to the protective resin layer is a layer of adhesive which is used to join the two substrate halves. According to DE-A-3246857, hotmelt adhesives containing a mixture of one or more thermoplastic elastomers as basic polymer are used as the adhesive. In addition, it is clear from the teaching of DE-A-3246857 that the hotmelt adhesives described therein contain normal tackifying resins and additives, for example fillers, antioxidants or UV absorbers, to increase their heat and weathering resistance. It is also stated that the melt viscosity of the adhesive should not exceed a value of 1,000 poises at 160° C. to ensure that the adhesive does not have any adverse effects on the metallic film applied by vapor deposition. There is no mention of the suitability of these adhesives for the production of DVDs.

According to the teaching of DE-A-3840391, the use of hotmelt adhesives for bonding substrate pairs in the production of video discs or digital audio discs is problematical on account of their poor thermal stability. The use of UV-curable monomer compositions as the adhesive can cause corrosion of the substrate. For bonding the substrate pairs in the production of video discs, DE-A-3840391 proposes the use of UV-crosslinkable hotmelt adhesives. There is nothing to indicate whether these UV-crosslinkable hotmelt adhesives would be suitable for the production of DVDs.

As mentioned at the beginning, DVDs are distinguished from known CDs or optical discs (also known as laser discs) by a high data or information storage density of the storage medium so that they impose greater demands on the production process and on the materials used therein, for example adhesives. The associated problems are described in detail in EP-A-0 735 530. In view of the high information density and the small diameter of a disc of a DVD, the tolerable deviation from the optimal planar orientation of the disc on insertion into the player is significantly smaller than with conventional laser discs so that a minor deviation of the orientation of the disc can clearly falsify the information signal reproduced. For this reason, a DVD inserted into the player has to be able to stay in the player without warpage or distortion, even under the thermal stress of a relatively long playing time, although the two individual layers of the DVD only consist of about 0.6 mm thick plastic blanks. UV-curing adhesives tend towards adhesion failures, for example when subjected to impact stress, because they are generally very brittle after curing. Also, most UV-curing adhesives and other two-component adhesives are characterized by relatively high inherent shrinkage. The resulting force applied by the adhesive to the reflective layer can impair the information content and operational reliability of the DVD. For this reason, EP-A-0 735 530 proposes a combination of a hotmelt adhesive and a liquid two-component adhesive for bonding the two halves of the DVD together. Compositions for the proposed hotmelt adhesives are not mentioned. It is proposed that cationically polymerizing UV-curing adhesives be used for the liquid two-component adhesives.

WO-A-98/40833 describes the use of a hotmelt adhesive with a melt viscosity of more than 100,000 mPa.s at 160° C. for bonding digital video, discs (DVDs) of sandwich construction. In preferred embodiments, the hotmelt adhesives are said to contain pigments to obtain high-contrast backgrounds for improving the images/graphics and text on the DVDs. WO-A-98140833 does not provide any particulars of the thermal stability of the DVDs thus bonded, particularly with regard to distortion-free scanning of the information stored on the DVD.

JP-A-09 208 919 describes compositions of hotmelt adhesives for optical discs which consist essentially of three components. The first component is a styrene resin consisting of styrene/diene block copolymers or hydrogenated derivatives there of. The second component of the hotmelt adhesives is a tackifier based on rosin, terpene or petroleum resins, the softening point of the tackifier being said to be at least 115° C. and preferably at least 140° C. In addition, the hotmelt adhesives according to the teaching of the document in question are said to contain waxes, preferably paraffin waxes, micro waxes, low molecular weight polyethylene, low molecular weight polypropylene and non-crystalline poly-α-olefin. In particular, it is proposed to use waxes with no functional group in their molecular structure, preferably crystalline polypropylene with an average molecular weight of at most 20,000. Although JP-A-09 208 919 does mention standard adhesive properties, such as ring-and-ball softening point, melt viscosity, peel strength, bond strength and creepage at elevated temperature, the information provided is not conclusive as to the suitability of these adhesives for bonding DVDs.

Among the latest advances in the quality control of optical data carriers, above all DVDs, test systems have recently been developed to enable the tilt and dishing of DVDs to be determined by triangulation. To this end, the deflection of a reflected laser beam is evaluated. The degree of deflection is recorded through a receiver, which converts the position of the deflected beam into electrical signals, and transmitted to the analog/digital converter for evaluation. One example of such a test system is the Optical Disc Test System Advanced Version (ODT-A) of Conttec GmbH.

The adhesive used influences both the tilt and the dishing of a disc to a considerable extent, particularly in the presence of heat and/or: moisture.

Against the background of this prior art, the problem addressed by the present invention was to provide an adhesive which would enable DVDs to be economically produced without the disadvantages of UV-curing adhesives or the hitherto known hotmelt adhesives and which would still meet the strict requirements of the latest quality control standards for DVDs.

SUMMARY OF THE INVENTION

The solution to this problem is defined in the claims and consists essentially in the use of a hotmelt adhesive for the production of digital versatile discs (DVDs) based on a) at least one thermoplastic elastomer,
b) at least one hydrocarbon resin,
c) at least one poly-α-olefin,
d) at least one polar wax bearing functional groups.

In. addition to the key components mentioned above, the hotmelt adhesives to be used in accordance with the invention may also contain tackifying resins, optionally plasticizers, stabilizers/antioxidants, optionally fillers or extenders, pigments, coupling agents and mixtures therof.

BRIEF DESCRIPTION OF THE DRAWINGS

FIG. 1 is a cross-sectional view of a digital video disc.

FIG. 2 is an enlarged cross-sectional view of a digital video disc of the present invention.

DETAILED DESCRIPTION OF THE INVENTION

Examples of the thermoplastic elastomers of component a) are thermoplastic polyurethanes (TPU) which are generally based on aromatic diisocyanates. Block copolymers of the A-B-, A-B-A-, A-(B-A)$_n$-B- and (A-B)$_n$ -Y- type, where A is an aromatic polyvinyl block and the B block surrounds a rubber-like middle block which may be partly or completely hydrogenated, are also particularly suitable. Examples of such block copolymers contain a polystyrene block as A and a substantially rubber-like polybutadiene and/or polyisoprene block as B, Y may be a polyfunctional compound and n is an integer of at least 3. To improve thermal stability, the middle block B (i.e. the polybutadiene or polyisoprene block) may optionally be partly hydrogenated so that the double bonds originally present are at least partly removed. Block copolymers such as these are also available from various manufacturers as SBS (styrenelbutadiene/styrene) copolymers or as SIS (styrene/isoprene/styrene) copolymers or as SEPS (styrene/ethylene/propylene/styrene), SEEPS (styrene/ethylene/ethylene/propylene/styrene) or SEBS (styrene/ethylene/butadiene/styrene) copolymers.

The hydrocarbon resin of component b) may be selected from aliphatic, cycloaliphatic or aromatic hydrocarbon resins or even aliphatic/aromatic hydrocarbon resins, petroleum hydrocarbon resins and hydrogenation products and mixtures ther eof. These hydrocarbon resins are known to be polymers with a molecular weight of, in general, <2,000. They are obtained by the polymerization of $C_5$ cuts of unsaturated compounds and, in many cases, are hydrogenated in a following step. Actual examples are hydrocarbon resins based on polycyclopentadiene with subsequent hydrogenation —such products are marketed by Exxon under the name of Escorez. Similar products are also marketed by CdF Chemie under the name of Norsolene, by Goodyear under the name of Wing-Tack, by Hercules under the names of Hercures, Kristalex and Piccotac and by Reichhold under the name of Sta-tac and by Idemitsu.

Suitable poly-α-olefins of component c) are the atactic α-olefin copolymers and terpolymers of ethylene, propylene and/or 1-butene with molecular weights in the range from 5,000 to 30,000, the molecular weight being determined as a number average by gel permeation chromatography (GPS) in accordance with DIN 55 672. It is known that copolymers and terpolymers such as these can be obtained from the above-mentioned. monomers by a continuous Ziegler low-pressure polymerization process. They are also known as poly-α-olefins (APAO) although the poly-α-olefins used in a particularly preferred embodiment of the invention have a significant crystalline component. This partial crystallinity can be determined by differential thermoanalysis (DTA) because the partly crystalline poly-α-olefins can have one or more pronounced peak maxima in the melting curve.

The polar waxes bearing functional groups of component d) are preferably selected from the group of functionalized polyolefins —with a molecular weight range (GPC) of about 4,000 to about 80,000 —based on ethylene and/or propylene with acrylic acid, methacrylic acid and $C_{1-4}$ esters there of, itaconic acid, fumaric acid, vinyl acetate, carbon monoxide and in particular maleic acid and mixtures there of. The polyolefins in question are preferably ethylene, propylene and ethylene/propylene copolymers grafted or copolymerized with polar monomers which have saponification or acid values of 2 to 50 mg KOH/g.

The hotmelt adhesives according to the invention may optionally contain auxiliaries and additives known per se, including fillers, pigments, plasticizers and stabilizers. Suitable fillers are, for example, calcium carbonate, calcium/magnesium carbonate, talcum, silica, carbon black, zinc white, titanium dioxide or other inorganic pigments.

The plasticizers optionally used are largely determined by the polymer component used. Examples of plasticizers are process oils, more particularly naphthenic process oils, paraffin oils, castor oil, low molecular weight polybutenes or polyisobutylenes or polyisoprenes and dialkyl or alkylaryl esters of phthalic acid.

Stabilizers or antioxidants for reducing oxidative degradation may be selected from a number of commercially available antioxidants. Examples include sterically hindered phenols and/or thioethers and the like. It can be of advantage to combine two or more antioxidants of different chemical composition to obtain particularly high stability.

Accordingly, the hotmelt adhesives according to the invention contain 10 to 40% by weight and preferably 15 to 30% by weight of at least one thermoplastic elastomer 15 to 50% by weight and preferably 25 to 45% by weight of at least one hydrocarbon resin 10 to 40% by weight and preferably 15 to 30% by weight of at least one poly-α-olefins 10 to 45% by weight and preferably 15 to 35% by weight of at least one polar wax bearing functional groups 0 to 10% by weight and preferably 0.5 to 10% by weight of auxiliaries and additives the total quantity of the above-mentioned constituents being 100% by weight.

The key steps involved in the use of the hotmelt adhesive in accordance with the invention are explained in the following with reference to FIG. 2.

1.) The two substrate blanks which today consist essentially of polycarbonate are made by injection molding.

2.) The substrate half 3, which has received the information layer in the form of pits during the injection molding process, is coated with a reflective layer, generally a metallic layer, for example of aluminium applied by vapor deposition in vacuo.

3.) The second substrate half 3 may also contain an information layer. However, it may also be printed on the inside with images/graphics and text by various methods. For example, the inside may be provided with a multi-color mirror-image impression 6.

4.) Either one or both substrate halves are coated with the hotmelt adhesive 5. The two substrate halves are then joined together to form the complete DVD.

The hotmelt adhesives to be used in accordance with the invention are normally applied to the substrate halves in a layer thickness of 30 pm or more, generally by roller, at temperatures of at least 140° C. and preferably 160° C. High melt viscosities of 60,000 to 130,000 mPa.s have proved to be highly advantageous for this purpose because the hotmelt adhesive can be cleanly applied, even at the very high rates of application required for the hotmelt adhesive, without the adhesive egressing beyond the outer margins of the DVDs. In addition, stringing is avoided at these high viscosities. Moreover, the hotmelt adhesives have very high cohesion so that the DVD thus produced shows good and quick recovery after bending in the use or handling of the DVD.

The use of the hotmelt adhesives in accordance with the invention affords the following advantages over the known UV-curing adhesives.

Hotmelt adhesives are more economical by a factor of at least 4. The gluing lines for hotmelt adhesives are also less expensive than the machinery and equipment required for UV-curing systems.

The adhesives can be pigmented or colored which opens up many design possibilities for the DVDs.

Hotmelt adhesives show good adhesion behavior, particularly under impact stress, above all at low temperatures.

Hotmelt adhesives are better able to correct inaccuracies or dimensional deviations in the polycarbonate substrates.

Normally, no waste collects during production in the application of hotmelts.

There are no emissions of health-endangering gases such as, for example, ozone or monomer vapors.

In the event of product changes or production stoppages, there are no disposal problems with the hotmelt residues. Such residues can be disposed of in small quantities as factory waste.

The preferred embodiments of the present invention are illustrated by the following Examples which are not intended in any way to limit the scope of the invention. So far as the compositions are concerned, all quantities represent parts by weight unless otherwise indicated.

In the spot test, a polycarbonate (PC) substrate of the type used in the production of DVDs is coated with a spot of hotmelt adhesive and then hand-tested for peel strength and impact strength. The evaluation was made on a scale of 0 (=poor) to 15 (=very good).

It is clear from the results shown that the hotmelt adhesives according to the invention have very good heat resistance, good to very good peel strengths and very good impact strength.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Polycyclopentadiene resin[1] | 32.0 | 37.0 | 30.0 | 35.0 | 32.0 | 30.0 | 30.0 | | 30.0 | |
| Hydrocarbon resin[2] | | | | | | | | 30.0 | | 30.0 |
| EPDM | | | | 14.5 | | | | | | |
| Styrene/ethylene/butylene copolymer (SEBS)[3] | | 11.0 | | | 16.0 | 19.5 | 10.0 | 10.0 | 10.0 | |
| Styrene/ethylene/butylene block copolymer (SEBS)[4] | | | | | | | | | | 10.0 |
| Styrene/isoprene/block polymer hydrogenated[5] | 16.0 | | 19.5 | | | | 9.5 | 9.5 | 9.5 | 9.5 |
| APAO[6] | 20.0 | 20.0 | 25.0 | 25.0 | 20.0 | 25.0 | 25.0 | 25.0 | 25.0 | 25.0 |
| Irganox 1010[7] | 0.5 | 0.5 | 0.5 | 0.5 | 0.5 | 0.5 | 0.5 | 0.5 | 0.5 | 0.5 |
| Propylene/maleic anhydride copolymer[8] | | | | 25.0 | | | | | | |
| Ethylene/maleic acid copolymer[9] | 21.0 | 21.0 | | | 21.0 | | | | | |
| Ethylene/maleic anhydride copolymer[10] | | | 25.0 | | | 25.0 | 25.0 | | | |
| Ethylene/maleic anhydride copolymer[11] | | | | | | | | 25.0 | 25.0 | 25.0 |
| Ethylene/ethyl acrylate/maleic anhydride terpolymer[12] | 10.5 | 10.5 | | | 10.5 | | | | | |
| | 100.0 | 100.0 | 100.0 | 100.0 | 100.0 | 100.0 | 100.0 | 100.0 | 100.0 | 100.0 |
| Softening point ° C. | 109.3 | 103.9 | 114.2 | 150.8 | 134.4 | 140.4 | 128.5 | 136.5 | 135.1 | 123.6 |
| Viscosity 160° C. | 51250 | 33350 | 39333 | 24120 | 840000 | 190750 | 56625 | 114000 | 66875 | 111000 |
| Viscosity 170° C. | | | | | | | | | | |
| Viscosity 180° C. | 23050 | 18500 | 17042 | 8700 | 140000 | 49333 | 23750 | 43750 | 33125 | 46250 |
| Viscosity 200° C. | 13475 | 9600 | 8000 | 4950 | 22250 | 17000 | 12594 | 23550 | 19094 | 16000 |
| Heat resistance [° C.] PC/PC 0.02 N/mm$^2$ | 82/80/84 (c) | | 81/80/76 (c) | | 86/86/85/ 81 (c) | 76/78/86/ 81 (c) | 80/80/85 (c) | 90/91/91/ 84 (c) | 81/80/86/ 86 (c) | 87/87/86/ 86 (c) |
| PC (peel/impact) | 15/10 | 15/8 | 15/10 | 0/— | 15/15 | 15/15 | 15/15 | 12/— | 15/15 | 12/12 |

[1] viscosity 180° C.: 850 mPa.s
[2] based on hydrogenated dicyclopentadiene, viscosity: 4900 mPa.s/180° C.
[3] viscosity 600 mPa.s/25° C. (20% in toluene)
[4] viscosity 200 mPa.s/25° C. (20% in toluene)
[5] viscosity 30 mPa:s/30° C. (10% in toluene)
[6] melt viscosity 8000 mPa.s/190° C.; molecular weight (GPS) 11,600
[7] antioxidant (Ciba Specialty Chemicals)
[8] molecular weight (GPS) 3900; acid value 45 mg KOH/g
[9] molecular weight (GPS) 5600; acid value 2 mg KOH/g
[10] graft polymer viscosity 600 mPa.s/140° C.; saponification number 4 mg KOH/g
[11] graft polymer, viscosity 4200 mPa.s/140° C.; saponification value 34 mg KOH/g
[12] melt index 200 g/10 mins.; acid value 17 mg KOH/g; comonomer content 9%

The compositions listed in Table 1 were mixed to homogeneity in the melt in a heatable mixing and stirring vessel.

Softening point was measured in accordance with ASTM E28, viscosity in accordance with ASTM D3236 using a Brookfield RVT viscosimeter (spindle 27). Heat resistance was determined in the bonding of two polycarbonate test strips (PC) with a 25 ×25 mm overlapping bond, a weight of 1360 g being applied to the bonded substrates which were then heated at a rate of 5° C. per 10 mins. The temperature at which the bond failed was recorded in several individual tests ("c"=cohesive failure).

Hotmelt adhesives according to the invention and a known hotmelt adhesive (based on the teaching of JP-A-09 208 919) were tested for tilt and dishing by the ODT-A method before and after ageing. In the ageing test, the bonded test DVDs were stored for 96 hours at 80° C./95% relative air humidity and, before the measurement, were conditioned for 24 hours in a normal climate. The test DVDs were produced in a Krauss-Maffei injection molding machine and were coated with adhesive in a commercially available hotmelt bonder. The ODT-A measurements were carried out in a Conttec tester. The results are set out in Table 2 below. The specification for 120 mm DVD-RAM allows a maximum and minimum deviation in the radial direction (dishing) of 0.70° and a maximum and minimum tilt of 0.30°. As can be seen from Table 2 below, the Examples according to the invention meet this requirement very well both before and after ageing. The tilt and dishing values of the DVDs bonded with the known adhesive after ageing are far too high.

TABLE 2

|  | 11 | 12 | 13 | Comp. 1 | Comp. 2 |
|---|---|---|---|---|---|
| Dishing |  |  |  |  |  |
| before ageing |  |  |  |  |  |
| minimum (degrees) | −0.27 | −0.18 | −0.30 | n.a. | n.a. |
| maximum (degrees) | 0.04 | 0.26 | 0.24 | n.a. | n.a. |
| after ageing |  |  |  |  |  |
| minimum (degrees) | −0.62 | −0.53 | −0.64 | −0.27 | −1.74 |
| maximum (degrees) | −0.11 | 0.16 | 0.08 | 1.47 | 0.68 |
| Tilt |  |  |  |  |  |
| before ageing |  |  |  |  |  |
| minimum (degrees) | −0.23 | −0.20 | 0.28 | n.a. | n.a. |
| maximum (degrees) | 0.07 | 0.16 | 0.09 | n.a. | n.a. |
| after ageing |  |  |  |  |  |
| minimum (degrees) | −0.27 | −0.24 | −0.29 | −0.48 | −0.48 |
| maximum (degrees) | 0.10 | 0.09 | 0.13 | 0.81 | 0.11 | n.a. = not available

What is claimed is:

1. A process for preparing a digital video disc comprising
   (a) providing at least two blanks;
   (b) providing a hot melt adhesive comprising
      (i) 10 weight percent to 40 weight percent of at least one thermoplastic elastomer,
      (ii) 15 weight percent to 50 weight percent of at least one hydrocarbon resin,
      (iii) 10 weight percent to 40 weight percent of at least one poly-α-olefin, and
      (iv) 10 weight percent to 45 weight percent of at least one polar wax bearing functional groups having a molecular weight range of 4,000 to 80,000;
   (c) applying the hot melt adhesive directly or indirectly onto at least one of the blanks; and
   (d) bonding the two or more blanks together using the hot melt adhesive.

2. The process of claim 1, wherein the thermoplastic elastomer comprises one or more styrene/diene block copolymers, styrene/isoprene/styrene copolymers or styrene/butadiene/styrene copolymers, or at least partly hydrogenated derivatives there of, or mixtures there of.

3. The process of claim 1, wherein the hydrocarbon resin comprises one or more cycloaliphatic hydrocarbon resins, aromatic hydrocarbon resins, aliphatic hydrocarbon resins, aliphatic/aromatic hydrocarbon resins or petroleum hydrocarbon resins, or hydrogenation products there of, or mixtures there of.

4. The process of claim 1 wherein the poly-α-olefin comprises one or more aractic α-olefin copolymers or atactic α-olefin terpolymers, wherein the copolymers or terpolymers have a molecular weight range of 5,000 to 30,000 and comprise polymerized units of ethylene, propylene or 1-butene, or combinations there of.

5. The process of claim 1 wherein the polar wax comprises one or more functionalized polyolefins having polymerized units of ethylene or propylene, or combinations there of, and are functionalized with at least one acrylic acid, methacrylic acid, $C_{1-4}$ esters of acrylic acid or methacrylic acid, maleic acid, itaconic acid, fumaric acid, vinyl acetate, or carbon monoxide or mixtures there of.

6. The process of claim 5, wherein the functionalized polyolefins have a saponification or acid value of 2 to 50 mg KOH/g.

7. The process of claim 1 wherein the hot melt adhesive further comprises one or more fillers, pigments, plasticizers, rackifying resins, antiagers, antioxidants, UV stabilizers or coupling agents, or combinations there of.

8. The process of claim 1 wherein the thermoplastic elastomer comprises one or more styrene/diene block copolymers, styrene/isoprene/styrene copolymers or styrene/butadiene/styrene copolymers, or at least partly hydrogenated derivatives there of, or mixtures there of, wherein the hydrocarbon resin comprises one or more cycloaliphatic hydrocarbon resins, aromatic hydrocarbon resins, aliphatic hydrocarbon resins, aliphatic/aromatic hydrocarbon resins or petroleum hydrocarbon resins, or hydrogenation products there of, or mixtures there of, wherein the poly-α-olefin comprises one or more atactic α-olefin copolymers or atactic α-olefin terpolymers having a molecular weight range of 5,000 to 30,000 and comprising polymerized units of ethylene, propylene or 1-butene, or combinations there of, and wherein the polar wax comprises one or more functionalized polyolefins.

9. The process of claim 8 wherein the hot melt adhesive further comprises one or more fillers, pigments, plasticizers, tackifying resins, antiagers, antioxidants, UV stabilizers, or coupling agents or combinations there of.

10. The process of claim 1 further comprising the steps of
   (e) applying an information layer to at least one of the blanks, and
   (f) coating the information layer with a light-reflecting layer, wherein the hot melt adhesive is applied to the blank after the blank is coated with the reflective layer.

11. The process of claim 10 wherein an anti-corrosion layer is applied to the light reflecting layer prior to the application of the hot melt adhesive.

12. The process of claim 10 further comprising applying a print layer to at least one of the blanks wherein the print layer comprises graphics or text, or combinations there of.

13. The process of claim 12 wherein the hot melt adhesive is also applied to the print layer.

14. The process of claim 10 wherein the thermoplastic elastomer comprises one or more styrene/diene block copolymers, styrene/isoprene/styrene copolymers or styrene/butadiene/styrene copolymers, or at least partly hydrogenated derivatives there of, or mixtures there of, wherein the hydrocarbon resin comprises one or more cycloaliphatic hydrocarbon resins, aromatic hydrocarbon resins, aliphatic hydrocarbon resins, aliphatic/aromatic hydrocarbon resins or petroleum hydrocarbon resins, or hydrogenation products there of, or mixtures therof, wherein the poly-α-olefin comprises one or more atactic α-olefin copolymers or atactic α-olefin terpolymers having a molecular weight range of 5,000 to 30,000 and comprising polymerized units of ethylene, propylene or 1-butene, or combinations there of, and wherein the polar wax comprises one or more functionalized polyolefins.

15. A digital video disc prepared by the process of claim 1.

16. A digital video disc comprising
(a) at least two blanks, wherein each blank has an inner surface;
(b) at least one information layer located on the inner surface of a first blank;
(c) at least one light reflecting layer located on the information layer;
(d) at least one layer of hot melt adhesive located between the light reflecting layer of the first blank and a second blank, wherein the hot melt adhesive bonds the first and second blanks together and comprises
  (i) 10 weight percent to 40 weight percent of at least one thermoplastic elastomer,
  (ii) 15 weight percent to 50 weight percent of at least one hydrocarbon resin,
  (iii) 10 weight percent to 40 weight percent of at least one poly-α-olefin, and
  (iv) 10 weight percent to 45 percent of at least one polar wax bearing functional groups having a molecualr weight range of 4,000 to 80,000.

17. The digital video disc of claim 16 wherein the second blank comprises a print layer located on the inner surface of the second blank, the print layer comprising graphics or text, or combinations there of, and wherein the hot melt adhesive layer is located between the print layer of the second blank and the light reflecting layer of the first blank.

18. The digital video disc of claim 17 wherein the thermoplastic elastomer comprises one or more styrene/diene block copolymers, styrene/isoprene/styrene copolymers or stryene/butadiene/styrene copolymers, or at least partly hydrogenated derivatives there of, or mixtures of thereof, wherein the hydrocarbon resin comprises one or more cycloaliphatic hydrocarbon resins, aromatic hydrocarbon resins, aliphatic hydrocarbon resins, aliphatic/aromatic hydrocarbon resins or petroleum hydrocarbon resins, or hydrogenation products there of, or mixtures thereof, wherein the poly-α-olefin comprises one or more aractic α-olefin copolymers or aractic α-olefin terpolymers having a molecular weight range of 5,000 to 30,000 and comprising polymerized units of ethylene, propylene or 1-butene, or combination thereof, and wherein the polar wax comprises one or more functionalized polyolefins.

19. The digital video disc of claim 16 wherein the thermoplastic elastomer comprises one or more styrene/diene block copolymers, styrene/isoprene/styrene copolymers or styrene/butadiene/styrene copolymers, or at least partly hydrogenated derivatives there of, or mixtures there of, wherein the hydrocarbon resin comprises one or more cycloaliphatic hydrocarbon resins, aromatic hydrocarbon resins, aliphatic hydrocarbon resins, aliphatic/aromatic hydrocarbon resins or petroleum hydrocarbon resins, or hydrogenation products there of, or mixtures there of, wherein the poly-α-olefin comprises one or more atactic α-olefin copolymers or atactic α-olefin terpolymers having a molecular weight range of 5,000 to 30,000 and comprising polymerized units of ethylene, propylene or 1-butene, or combinations there of, and wherein the polar wax comprises one or more functionalized polyolefins.

* * * * *

UNITED STATES PATENT AND TRADEMARK OFFICE
CERTIFICATE OF CORRECTION

PATENT NO. : 6,767,424 B1
DATED : July 27, 2004
INVENTOR(S) : Butterbach et al.

It is certified that error appears in the above-identified patent and that said Letters Patent is hereby corrected as shown below:

Column 9,
Lines 52, 57, 58 and 64, delete every occurrence of "there of" and insert -- thereof --.
Line 60, delete "aractic" and insert -- atactic --.

Column 10,
Line 11, delete "rackifying" and insert -- tackifying --.
Lines 2, 5, 12, 18, 23, 29, 34, 47, 60 and 66, delete "there of" and insert -- thereof --.
Line 60, delete "therof" and insert -- thereof --.

Column 11,
Line 27, delete "there of" and insert -- thereof --.

Column 12,
Line 1, delete the word "of" after "mixtures".
Lines 7 and 8, delete "aractic" and insert -- atactic --.
Lines 1, 6, 19, 25 and 31, delete every occurrence of "there of" and insert -- thereof --.

Signed and Sealed this

Fifteenth Day of February, 2005

JON W. DUDAS
*Director of the United States Patent and Trademark Office*